United States Patent Office 2,907,787
Patented Oct. 6, 1959

2,907,787

PREPARATION OF PHOSPHONO-THIONO ESTERS OF 2-HYDROXYETHYL SULFIDES

Friedrich W. Hoffmann, Bel Air, Md., and Thomas R. Moore, Middletown, N.Y., assignors to the United States of America as represented by the Secretary of the Army No Drawing. Application November 13, 1957
Serial No. 696,296

6 Claims. (Cl. 260—461)

(Granted under Title 35, U.S. Code (1952), sec. 266)

The invention described herein may be manufactured and used by or for the Government of the United States of America for governmental purposes without the payment to us of any royalty thereon.

This invention relates to the preparation of compounds of the formula

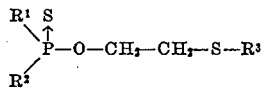

Such compounds are of utility as insecticides. They may also be isomerized by heating to produce biologically active compounds of the formula

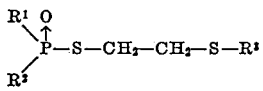

Our process consists in transesterifying a compound of the formula

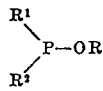

with an alcohol of the formula

$$R^3-S-CH_2-CH_2-OH$$

to give a compound of the formula

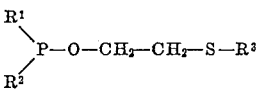

This last named compound is then treated with sulfur to give our desired compounds.

The transesterification step is carried out by heating a mixture of the two compounds at the boiling point of the mixture, and distilling off the alcohol ROH. While the reaction can be carried out without a catalyst, lower reaction temperatures, higher reaction rates, and improved yields are obtained by the use of catalytic quantities of metallic sodium, aluminum chloride, or a dialkyl hydrogen phosphite, e.g. diethyl hydrogen phosphite. The sulfurization step is then carried out by simply adding sulfur to the compound.

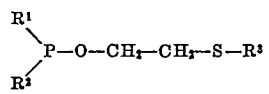

The reaction is exothermic and for best yields the temperature should be kept at about 50° C. by cooling. (At higher temperatures isomerization of the product takes place.)

In the above formulas $R^1$ is an alkyl group, $R^2$ is an alkoxy group, R is an alkyl group which is so selected that the alcohol ROH has a substantially lower boiling point than the alcohol $R^3$—S—$CH_2$—$CH_2$—OH, and $R^3$ is either an alkyl, aryl, or heterocyclic group.

Preferably, R, $R^1$ and $R^2$ contain from 1 to 4 carbon atoms and $R^3$ is preferably an alkyl group of 1 to 4 carbon atoms, since the products in this range of carbon atoms are of greatest importance at present. The reaction is, however, general and the number of carbon atoms may be varied greatly, so long as the boiling point relationship of the alcohol ROH and the thioethanol are maintained. $R^3$, in particular, may be varied almost at will, so long as it is thermally stable and does not enter into side reactions. In addition to higher alkyl groups, such as octyl and hexadecyl, aryl groups such as phenyl, naphthyl, or cresyl, and heterocyclic groups, e.g. pyridyl or tetrahydrofurfuryl may be employed.

As compared to older methods of making the same compounds, our process is advantageous in that the reaction products are colorless and do not undergo discoloration during prolonged storage, whereas the products of prior methods are usually yellow and rapidly turn brown on storage. Moreover, our process uses materials which are often more readily available than those used in the older methods. It is also more readily adaptable to continuous operation than prior methods.

The following examples illustrate our invention:

EXAMPLE I

*O-ethyl 2-ethylthioethyl methylphosphonothioate*

A mixture of 2-ethylthioethanol and diethyl methylphosphonite in a molar ratio of 1:1 was slowly heated with stirring while passing a slow stream of oxygen-free nitrogen through the apparatus. No catalyst was employed. Ethanol was distilled off. The reaction mixture was then distilled in vacuo. The transesterification step gave a 34% yield of ethyl 2-ethylthioethyl methylphosphonite, B.P. 40° (0.040 mm.), $n_D^{25}$ 1.4782.

Analysis.—Calcd. for $C_7H_{17}O_2PS$: C, 42.83; H, 8.73; P, 15.79; S, 16.34. Found: C, 42.7; H, 8.8; P, 15.60; S, 16.57.

Flowers of sulfur in 10% excess of the theoretical amount was added to the methylphosphonite, obtained from the transesterification step, over a period of ½ hour with occasional cooling to maintain the temperature below 50° C. The mixture was then distilled in a falling-film molecular still.

The sulfur-addition step gave a 55% yield of O-ethyl O - (2 - ethylthioethyl) methylphosphonothioate, $n_D^{25}$ 1.5027; $d_4^{25}$ 0.9963.

Analysis.—Calcd. for $C_7H_{17}O_2PS_2$: C, 36.82; H, 7.51; P, 13.57; S, 28.09. Found: C, 36.7; H, 7.4; P, 13.65; S, 27.60.

The major by-product in the transesterification step is the compound produced by exchange of two alkyl groups of the original phosphonite by the alcohol

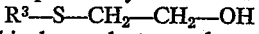

$$R^3-S-CH_2-CH_2-OH$$

The yield of this by-product can be considerably decreased, with consequent increase of the yield of the desired monotransesterification product, by the employment of amounts of the starting phosphonite in excess of the theoretical amount needed. This excess phosphorus ester can then be recovered and recycled or used in subsequent batch runs.

Other reactions performed in this way and their yields are as follows:

EXAMPLE II

*O-n-propyl O-(2-ethylthioethyl) methylphosphonothioate*

The procedure of Example I was repeated with the substitution of di n-propyl methylphosphonite for diethyl methylphosphonite. Oxygen free notrogen was passed through the apparatus during this entire operation and no catalyst was employed. In this mixture propanol was distilled off. The transesterification step gave a 24% yield of n-propyl 2-ethylthioethyl methylphosphonite, B.P. 53–56° (0.025 mm.), $n_D^{25}$ 1.4715.

*Analysis.*—Calcd. for $C_8H_{19}O_2PS$: C, 45.69; H, 9.11; P, 14.73; S, 15.25. Found: C, 44.9; H, 8.9; P, 15.37; S, 14.93.

The sulfur-addition step gave a 95% yield of O-n-propyl O-(2-ethylthioethyl) methylphosphonothioate, $n_D^{25}$ 1.4973.

*Analysis.*—Calcd. for $C_8H_{19}O_2PS_2$: C, 39.65; H, 7.90; S, 26.25. Found: C, 39.3; H, 8.0; S, 26.04.

EXAMPLE III

*O-isopropyl O-(2-ethylthioethyl) methylphosphonothioate*

The procedure of Example I was repeated with the substitution of diisopropyl methylphosphonite for diethyl methylphosphonite. Oxygen-free nitrogen was passed through the apparatus during this entire operation and no catalyst was employed. In this mixture isopropanol was distilled off. The transesterification step with one mole equivalent of 2-ethylthioethanol yielded 45% of isopropyl 2-ethylthioethyl methylphosphonite, B.P. 42–46° (0.100 mm.) $n_D^{25}$ 1.4678.

*Analysis.*—Calcd. for $C_8H_{19}O_2PS$; P, 14.73; S, 15.25. Found: P, 14.55; S, 15.46.

The sulfur-addition step gave a 90% yield of O-isopropyl O-(2-ethylthioethyl) methylphosphonothioate, $n_D^{25}$ 1.4919.

*Analysis.*—Calcd. for $C_8H_{19}O_2PS_2$: S, 26.25; P, 12.78. Found: S, 25.55; P, 13.14.

It is obvious that various changes are possible. We therefore wish our invention to be limited solely by the scope of the appended claims.

We claim:

1. The process of preparing phosphonothio esters which comprises transesterifying a dialkyl phosphonite of the first formula

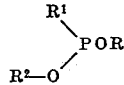

with an alcohol of the second formula

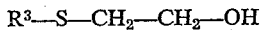

thereby producing a compound of the third formula

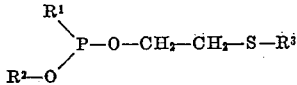

and an alcohol of the fourth formula

removing said last named alcohol, and reacting sulfur with said compound of the formula

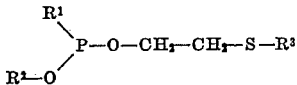

$R^1$, $R^2$ and R being lower alkyl groups with R being so selected so that the alcohol ROH has a boiling point which is (a) not substantially higher than that of the alcohol $R^2OH$ and (b) substantially lower than that of the substituted alcohol $R^3$—S—$CH^2$—$CH^2$—OH, and $R^3$ being selected from the class consisting of alkyl groups of not more than eighteen carbon atoms, phenyl, naphthyl, crseyl, pyridyl and tetrahydro furfuryl.

2. A process as defined in claim 1 wherein R, $R^1$ and $R^2$ contain from one to four carbon atoms and $R^3$ is an alkyl group containing from one to four carbon atoms.

3. The process of preparing phosphonothio esters which comprises transesterifying a dialkyl alkylphosphonite selected from the group consisting of diethyl methylphosphonite, di n-propyl methylphosphonite and diisopropyl methylphosphonite with 2-ethylthioethanol, thereby producing a substituted methylphosphonite and an alcohol of the group consisting of ethanol, propanol and isopropanol, removing said last named alcohol, and reacting sulfur with said substituted methylphosphonite to give a phosphonothio ester.

4. The process of preparing O-ethyl O-(2-ethylthioethyl) methylphosphonothioate which consists in heating to its boiling point a mixture of diethyl methylphosphonite and 2-ethylthioethanol, thereby producing ethyl 2-ethylthioethyl methylphosphonite and ethanol, removing said ethanol, and reacting sulfur with said ethyl 2 ethylthioethyl methylphosphonite to give O-ethyl O-(2-ethylthioethyl) methylphosphonothioate.

5. The process of preparing O-n-propyl O-(2-ethylthioethyl) methylphosphonothioate which consists in heating to its boiling point a mixture of di n-propyl methylphosphonite and 2-ethylthioethanol, thereby producing n-propyl 2-ethylthioethyl methylphosphonite and propanol, removing said propanol, and reacting sulfur with said n-propyl 2-ethylthioethyl methylphosphonite to give O-n-propyl O-(2-ethylthioethyl) methylphosphonothioate.

6. The process of preparing O-isopropyl O-(2-ethylthioethyl) methylphosphonothioate which consists in heating to its boiling point a mixture of diisopropyl methylphosphonite and 2-ethylthioethanol, thereby producing isopropyl 2-ethylthioethyl methylphosphonite and isopropanol, removing said isopropanol, and reacting sulfur with said isopropyl 2-ethylthioethyl methylphosphonite to give O-isopropyl O-(2-ethylthioethyl) methylphosphonothioate.

References Cited in the file of this patent

UNITED STATES PATENTS

| | | |
|---|---|---|
| 2,325,076 | Reuter | July 27, 1943 |
| 2,326,140 | Gzemski | Aug. 10, 1943 |
| 2,349,462 | Reuter | May 23, 1944 |
| 2,353,558 | Gzemski | July 11, 1944 |

OTHER REFERENCES

Kosolapoff: "Organo-Phosphorus Compounds," John Wiley & Sons, Inc., New York (1950), p. 141, 196.

Hoffman et al.: "J. Am. Chem. Soc.," 78, pp. 5817–21 (November 20, 1956).